Jan. 18, 1966 F. G. HEIMANN 3,229,821
VEHICLE MEAT RAIL
Filed July 21, 1964
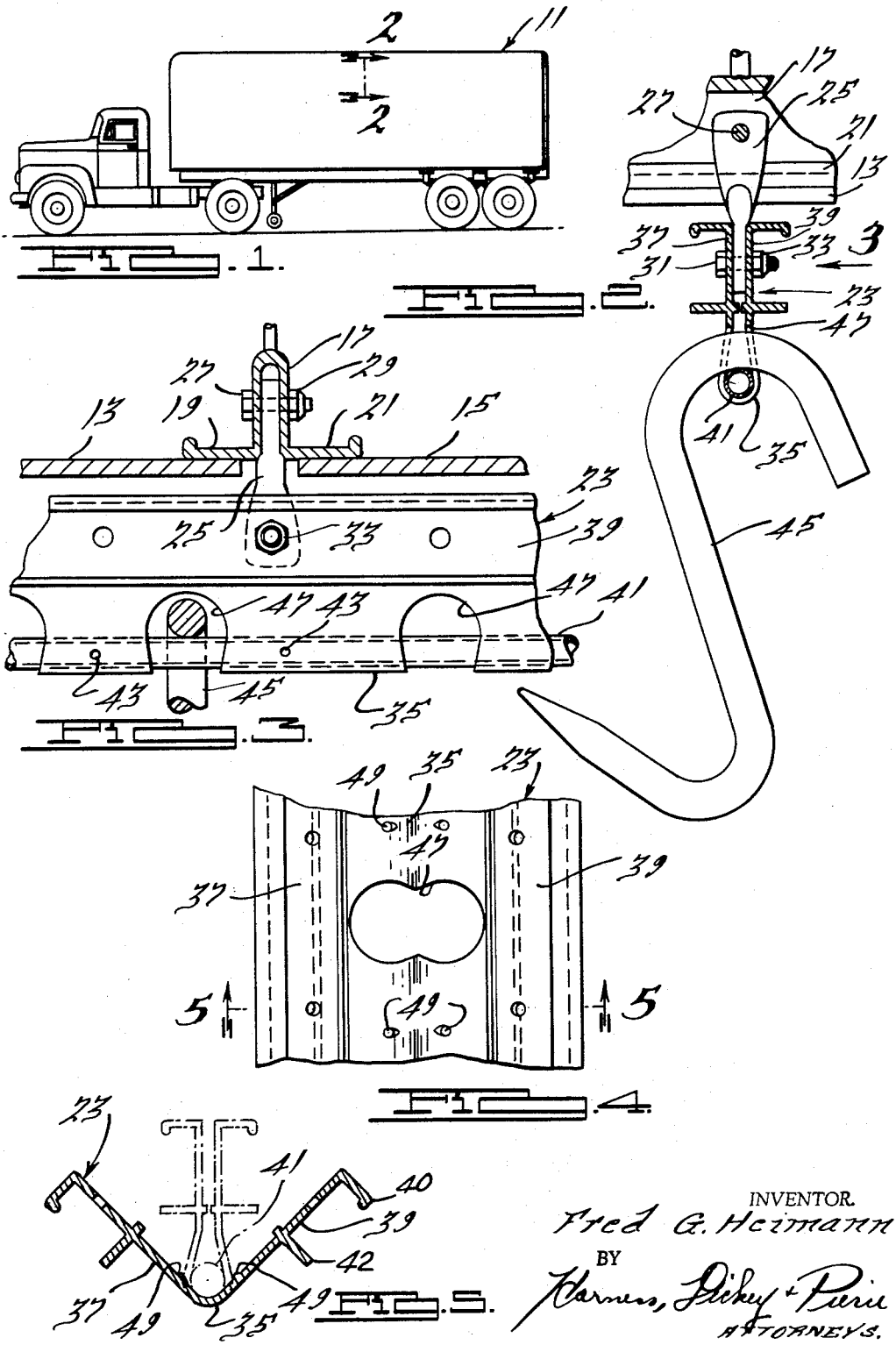
INVENTOR.
Fred G. Heimann
BY
Harness, Dickey & Pierce
ATTORNEYS.

United States Patent Office 3,229,821
Patented Jan. 18, 1966

3,229,821
VEHICLE MEAT RAIL
Fred G. Heimann, Mount Clemens, Mich., assignor to Fruehauf Corporation, Detroit, Mich., a corporation of Michigan
Filed July 21, 1964, Ser. No. 384,181
5 Claims. (Cl. 211—123)

This invention relates to vehicles for transporting meat and the like, and particularly to an improved meat hook supporting rail device for trucks, trailers and the like.

The meat rail structure to which the present invention relates is the type which extends along and is supported from the underside of the roof of a refrigerated trailer or truck. A plurality of hooks are suspended from the supporting rails at spaced positions therealong and each is adapted to hang, for example, sides of beef.

In the development of a meat rail structure, a number of factors must be considered. For example, the hook which hangs the meat must be constructed from a substance which will not decompose or otherwise objectionably react when in contact with the various meats. Also, the supporting rail from which the hooks are suspended must possess the properties of strength and rigidity to provide adequate support for the meats and hooks. Additionally, the weight of this supporting rail assembly should be kept to a minimum to minimize the overall truck or trailer weight.

With the above factors in mind, it has been the custom, in installations of this type, to construct the hooks from stainless steel and the supporting rails from aluminum extrusions. However, since it is necessary that the meat hooks be free to swing relative to their supporting rails, the aluminum rails must be modified for the swinging stainless steel hooks cause small particles of aluminum to peel off and fall upon the suspended meat, a highly undesirable condition.

Several devices have been proposed in the past and have met with varying degrees of success. In one device, a series of stainless steel loops are rigidly attached to the aluminum beam from which the hooks are suspended. In another, a stainless steel tube is rigidly suspended from the beam by spaced rigid straps with the meat hooks suspended therefrom. In the former, the relatively large stainless steel loops materially add to the overall weight of the supporting structure. Additionally, these loops are designed so that they hang relatively low from the vehicle roof thereby reducing the usable volume within the vehicle. In the latter, the straps are spaced relatively far apart leaving a considerable portion of the stainless steel tubing unsupported. This necessitates using a heavy gauge tubing or providing additional supporting straps. In either event, the overall cost and weight of the device is materially increased.

The present invention is calculated to overcome the aforementioned difficulties. Briefly, aluminum cross beams supported from the ceiling rigidly suspend a plurality of elongated extruded aluminum rail supports. Each of the rail supports in turn encloses and supports a relatively light stainless steel tube substantially along its entire length, the rail supports being broken away at spaced locations to receive the meat hooks. The overall weight of the device is minimized while achieving maximum support strength. Additionally, this structure facilitates a compact design thereby permitting maximum utilization of the vehicle interior.

An important object of the present invention therefore is an improved meat hook supporting rail for trucks, trailers, and the like.

A further object of the present invention is an improved meat rail of the above character which affords use of a maximum portion of the vehicle interior.

A further object of the present invention is to provide an improved meat rail of the above character which is durable in construction and relatively light in weight.

A further object of the present invention is to provide an improved meat rail of the above character which is relatively inexpensive to construct and affords easy and rapid assembly.

Further objects and advantages of the present invention will become more apparent from a consideration of the following detailed description taken in conjunction with the drawings in which:

FIGURE 1 is a side view of a highway vehicle incorporating the principles of the present invention;

FIGURE 2 is an enlarged fragmentary sectional view of the structure of FIGURE 1 taken along the line 2—2 thereof and illustrating the principles of the present invention;

FIGURE 3 is a view of the structure of FIGURE 2 taken in the direction of the arrow "3";

FIGURE 4 is a fragmentary plan view of the supporting rail of the present invention shown in the as-formed condition; and FIGURE 5 is a sectional view, in full lines, of the structure of FIGURE 4 taken along the line 5—5 thereof, and showing, in dot-dash lines, the completely formed supporting rail.

Referring now more specifically to the drawings, a carrier vehicle 11, for example, a refrigerated truck, is provided with a plurality of conventional spaced roof boards 13 and 15. A plurality of parallel cross members 17 (only one of which is shown) may be supported upon the roof boards 13 and 15, respectively, in the usual manner.

A meat rail assembly constructed according to the principles of the present invention is seen to include a supporting beam generally indicated at 23 rigidly suspended from the cross member 17 by suitable means such as spaced support links 25 (only one of which is shown). A suitable bolt 27 and nut 29 connect each of the links 25 to the cross member 17 while a bolt 31 and nut 33 connect the links 25 to the beam 23. It will be understood that additional beams 23 may be supported at spaced positions along their lengths by similar links (not shown) suspended from additional cross members (not shown) extending parallel to the cross members 17.

The supporting beam 23 is preferably constructed from a suitably strong and light material such as extruded aluminum generally elongate in form and is provided with a base or nesting portion 35 integral with a pair of upstanding wall portions 37 and 39. The beam 23 is also provided with longitudinally extending web portions 40 and 42 along the side walls 37 and 39 to add to the rigidity thereof. A relatively small tube 41 constructed preferably of stainless steel, is positioned within the nesting portion 35. Means, such as suitable dowel pins 43 may extend through aligned openings in the nesting portion 35 and tube 41 to fix the tube to the beam 23. Alternatively, each of the nesting portions 35 of the beams 23 and the tubes 41 may be provided with inwardly extending mating indentations as shown in FIGURES 4 and 5 and hereinafter described.

The tube 41 is designed to support a plurality of hooks 45 from which large portions of meat, for example, beef sides, are suspended. These hooks 45 are generally constructed from stainless steel in order that the meat may hang in contact therewith without decomposition of either the hook or meat or other adverse effect. The nesting portion 35 of the beam 23 is formed with slots 47 preferably of a smooth arcuate configuration as shown and of a size to freely receive the hooks 45. Thus, in use the hooks 45 hang directly from the stainless steel tubes 41 and because of the circular cross-section of both, have substantially point contact therewith. Therefore, no problem of aluminum metal peeling due to the rocking action of the hooks exists since all of the suspended weight is transmitted solely through the contacting point of the strainless steel hook and tube.

Additionally, the nesting portion 35 of each beam 23 is formed substantially continuous throughout the length of the respective tube 41 supported thereby and is broken away only at the slotted portions 47. Thus, a major portion of the tubes 41 are supported by this nesting portion 35 reducing the tendency for the tubes 41 to bend under the weight of the load carrying hooks 45. This, in turn, permits the use of smaller and lighter tubes which reduces the overal weight of the device. Further, the longitudinal web portions 40 and 42 increase the resistance of the beam 23 to transverse deflection.

As shown, the extruded aluminum beam 23 in its mounting extends relatively deep in a vertical direction as contrasted with its relatively narrow lateral dimension. This configuration provides a relatively large moment of inertia to resist transverse deflection thereof between the supports 25 while maintaining the weight thereof relatively low. To provide comparable strength against transverse deflection, separately supported stainless steel tubes or stainless steel loops of the prior art must be relatively large thereby materially increasing the overall weight of the device. For example, in the strap supported tube arrangement, the tube diameter would be required to be approximately the same as the vertical dimension of the beam 23.

The device of the present invention additionally facilitates easy assembly. Thus, as shown in FIGURES 4 and 5, the beam may initially be extruded, to a generally V-shaped cross-sectional configuration as shown in FIGURE 4 and in full lines in FIGURE 5. The beam in this configuration may have the slots 47 punched out or otherwise suitably formed as well as the openings for the bolts 33. Thereafter, the tube 41 may be positioned within the base or nesting portion 35 and the beam side walls 37 and 39 formed around the tube 41 to the position shown in dot-dash lines in FIGURE 5 where the supporting beam 23 is ready for attachment to the links 25. In forming the beam assembly, the side walls 37 and 39 may be swaged to form inwardly extending indentations 49 along their length and adjacent the nesting portion 35. Thus, when the beam 23 is formed around the tube 41, the indentations 49 will deflect adjacent portions of the tubes 41 inwardly locking the tubes and beams together and preventing the tubes from pulling out of the beams. Alternately, suitable dowel pins 43, as shown in FIGURE 3, may be inserted through the beam side walls 37 and 39 and through the tube 41 to lock the tubes and beams together.

Thus, the present invention provides a compact and extremely strong load supporting rail assembly. Additionally, this arrangement facilitates easy and rapid assembly and is lightin weight.

While a preferred embodiment of the present invention has been illustrated and described above, various additions, substitutions, modifications and omissions may be made thereto without departing from the spirit of the invention as encompassed by the appended claims.

What is claimed is:

1. A meat rail for suspending meat hooks from the roof of a vehicle comprising,
    an elongated beam adapted to be rigidly suspended from a vehicle roof,
    said beam being substantially continuous and having a downwardly depending nesting portion,
    a tube positioned within and substantially completely enveloped by said nesting portion and extending longitudinally thereof,
    said nesting portion having a plurality of slots formed therein along its length and defining with said tube a plurality of hook receiving apertures.

2. A supporting rail for suspending load supporting hooks from the roof of a vehicle comprising,
    an elongated extruded aluminum beam adapted to be rigidly suspended from a vehicle roof,
    said beam being substantially continuous and having a downwardly depending nesting portion,
    a stainless steel tube positioned within and substantially completely enveloped by said nesting portion and extending longitudinally thereof,
    said nesting portion having a plurality of slots formed therein along its length and defining with said tube a plurality of hook receiving apertures.

3. A supporting rail for suspending load supporting hooks from the roof of a vehicle comprising,
    an elongated beam adapted to be rigidly suspended from a vehicle roof,
    said beam being formed from a pair of continuous generally parallel side walls connected by a downwardly depending nesting portion,
    a tube positioned within and supported by said nesting portion and extending longitudinally thereof,
    said nesting portion having a plurality of slots formed therein along its length and together with said tube defining a plurality of hook receiving apertures.

4. The method of making a load suspending supporting rail for a vehicle comprising
    providing an elongated beam of strong light-weight material generally V-shaped in cross section and having a rounded nesting portion,
    slotting the beam at spaced locations along its nesting portion,
    placing a tube within said rounded nesting portion,
    and forming said beam around said tube with said slotted portions and the tube together defining spaced hook receiving apertures.

5. The method of making a load suspending supporting rails for a vehicle comprising,
    providing an elongated beam of extruded aluminum generally V-shaped in cross section having continuous side walls joined by a rounded nesting portion,
    forming inwardly extending protrusions along said side walls adjacent said nesting portion,
    slotting the beam at spaced locations along said nesting portion,
    placing a stainless steel tube within said nesting portion,
    and forming said beam around said tube with said protrusions deforming the tube inwardly providing a rigid connection therebetween,
    said slotted portions together with said tube defining spaced hook receiving apertures.

References Cited by the Examiner

UNITED STATES PATENTS

| | | | |
|---|---|---|---|
| 2,470,878 | 5/1949 | Tate | 248—215 |
| 3,081,882 | 3/1963 | Magnuson | 211—86 |
| 3,129,493 | 4/1964 | Grubb | 29—155 |
| 3,150,440 | 9/1964 | Jahn | 29—155 |

CLAUDE A. LE ROY, *Primary Examiner.*